United States Patent [19]

Hill et al.

[11] Patent Number: 4,770,884

[45] Date of Patent: Sep. 13, 1988

[54] CONTROL OF SALMONELLA ON POULTRY CARCASSES

[75] Inventors: James C. Hill, Des Peres; Frank J. Ivey, Creve Coeur, both of Mo.

[73] Assignee: Monsanto Company, St. Louis, Mo.

[21] Appl. No.: 98,446

[22] Filed: Sep. 18, 1987

[51] Int. Cl.$^4$ .............................................. A23B 4/14
[52] U.S. Cl. .................................. 426/332; 426/335; 426/644
[58] Field of Search ............... 426/327, 332, 335, 641, 426/644, 652

[56] References Cited

U.S. PATENT DOCUMENTS 3,124,468  3/1964  Williams .......................... 426/332 X
3,806,615  4/1974  Frankenfeld et al. .......... 426/641 X

OTHER PUBLICATIONS

Tiecco "Use of Ovosan for Egg Shell Washing", Industrial Alimentari, Nov. 1979, pp. 803–805.
Papparella, "San Pel in Poultry Slaughtering", Industrial Alimentari, Jul.–Aug. 1979, pp. 541–542.

*Primary Examiner*—Arthur L. Corbin
*Attorney, Agent, or Firm*—Jon H. Beusen; Howard C. Stanley; Arnold H. Cole

[57] ABSTRACT

This invention provides a means for control of Salmonella on meat-producing carcasses, e.g. poultry, during processing, comprising contacting the carcass with an acidic solution of an anionic sulfate or sulfonate surfactant.

10 Claims, No Drawings

CONTROL OF SALMONELLA ON POULTRY CARCASSES

This invention relates to control of Salmonella on meat-producing carcasses, particularly poultry carcasses.

Contamination of poultry carcasses with Salmonella is a problem that has received considerable attention over the years. Various approaches have been used to reduce Salmonella contamination of poultry carcasses, such as disinfection of poultry feed and water to minimize infection of the flock with Salmonella organisms; vaccination of poultry to minimize infection of the flock; administration of antibiotics; and modification of the poultry slaughtering and processing procedures to kill existing Salmonella organisms on the carcass and flesh or to minimize cross-contamination from one carcass to another.

Various acids, such as acetic, adipic, succinic, lactic and other organic acids have been suggested for addition to the scald tank. Chlorine has been added to the scald tank and to the chill tank. Heat treatment by raising the temperature of the scald tank or by introducing a hot water immersion prior to the chill tank have been proposed. Treatment of carcasses with phosphate salts prior to the chill tank has been suggested. Glutaraldehyde has been proposed to treat carcasses in the prechill water. Various combinations of these treatments have also been suggested.

In addition to the treatments discussed above, San Pel, a silicate-containing composition said to contain alkylbenzene sulfonates was proposed for use in the scald tank to control bacterial contamination. Salmonella were not present in any of the tests run. V. Papparella *San Pel in Poultry Slaughtering*, Industrie Alimentari, July-August 1979, pp. 541–42.

None of these procedures has been commercially successful. Many of the acid treatments adversely effect the appearance of the carcass or render the skin easily bruised and damaged during the remainder of the processing procedure. The heat treatments often result in a carcass that has a cooked appearance. Some of the procedures have proven effective at minimizing cross-contamination from one carcass to another, but it has proven substantially more difficult to remove and kill Salmonella organisms that have become attached to or impregnated in the poultry skin or other parts of the carcass.

Despite all of these efforts, practical control of Salmonella contamination of poultry carcasses has proven to be extremely difficult. A number of factors are important in obtaining a practical method for control of Salmonella in poultry processing. The method must not unduly adversely affect appearance or processability of the carcass or the flavor of the meat. The method must not introduce undesirable substances into the food chain. Additionally, the method would preferably be easily integrated into the current poultry processing plants and would not be unduly costly.

SUMMARY OF THE INVENTION

This invention is a method for controlling Salmonella during processing of a meat-producing carcass, such as a poultry carcass, comprising contacting the carcass for an effective amount of time with an aqueous solution at an acidic pH, preferably below about pH 4, more preferably below about pH 3 and even more preferably from about pH 1.5 to about pH 2.5. The pH of this solution is preferably achieved by addition of phosphoric acid. The aqueous solution comprises an anionic sulfate or sulfonate surfactant, preferably an alkyl sulfate or an alkylaryl sulfonate, more preferably lauryl sulfate, dodecylbenzene sulfonic acid, a methylnaphthalene sulfonic acid, and salts thereof, in an effective amount to control Salmonella, preferably from about 50 to about 400 parts per million, by weight, more preferably from about 100 to about 300 ppm. The process is preferably conducted at temperatures from about 0° to about 60° C. Preferred surfactants include sodium lauryl sulfate and dodecylbenzene sulfonic acid.

DETAILED DISCUSSION OF THE INVENTION

This invention is useful for controlling Salmonella contamination on any meat-producing carcasses, including pork, beef, chickens, turkeys, ducks, geese, and other commercial meat carcasses. For the sake of convenience, and because poultry represents the more difficult control problem and because chickens comprise the largest portion of the poultry market, the current invention will be referred to in terms of processing of chickens, however one skilled the art will understand that the discussion is applicable to other poultry and to other meat-producing carcasses as well.

Typically, poultry processing begins with slaughtering of the chicken. The carcass is then immersed in a scald tank, which is typically maintained at a temperature from about 50° to about 60° C., and the carcass is maintained in the scald tank from about ½ minute to about 2½ minutes. After being removed from the scald tank, the carcass is plucked, eviscerated and cleaned. During these procedures, water is sprayed on the carcass to remove the debris. The carcass is then taken to the chill tank, where the carcass is immersed in water from about 0° to about 16° C., preferably from about 0° to about 10° C., from about 15 to about 120 minutes, preferably from about 40 to about 120 minutes.

The current invention can be practiced in the scald tank, in the spray areas, in the chill tank, in a separate treatment step or in a combination of these locations. The presence of the surfactant may sometimes result in some foaming. For this reason, if it is desired to practice the current invention in the spray areas, it is preferred that the invention be conducted to minimize foaming, e.g. by use of lower concentrations of surfactant, of less vigorous spraying, or by other techniques known to one skilled in the art. If a separate treatment is used, this treatment may be anywhere in the processing scheme, such as just after the plucker, just after the eviscerator, or just before or just after the chiller step. The separate treatment may be conducted at elevated temperatures, since less time is required if elevated temperatures are used. The elevated temperatures should not be so high as to unduly adversely affect the appearance of the carcass. Preferred temperatures for this separate, elevated temperature treatment are from about 45° to about 60° C. for from about ½ to about 10 minutes, more preferably from about 50° to about 52° C. or even up to about 56° C. for from about 1 to about 3 minutes. This separate treatment can also be conducted at ambient or reduced temperatures, for an appropriate period of time.

This invention involves contacting the carcass with an acidic aqueous solution containing an anionic sulfate or sulfonate surfactant as described above. The pH of the solution can be attained by addition of the appropriate amount of any acid, provided that it does not interfere with activity of the surfactant. Preferred acids include acetic acid, lactic acid and phosphoric acid, with phosphoric acid being particularly preferred.

Preferred surfactants include alkyl sulfates and alkyl aryl sulfonates, particularly lauryl sulfate, dodecylbenzene sulfonic acid and alkyl naphthalenesulfonic acid, particularly a methyl naphthalenesulfonic acid. The alkyl substitutions for the two sulfonic acid species occurs on the aryl portion of the molecule. It is understood that there may be mono- or poly-alkyl substitutions or a mixture thereof. For example, the phrase "a methyl naphthalenesulfonic acid" includes monomethyl, polymethyl, and mixtures thereof. Typically the surfactant contains a range of alkyl groups with the name designating the length of the alkyl group being derived from the average length of the alkyl group. As an example the lauryl and the dodecyl groups referred to herein have an average of about 12 carbon atoms. The length of the alkyl chain can vary somewhat without loss of activity. Since the process of this invention is carried out under acidic conditions and often under strongly acidic conditions, the surfactants of this invention can be added either in acid form or as a salt. In either event, the active form of the surfactant will be determined by the pH of the solution. Because of their commercial availability, the most preferred surfactants are sodium lauryl sulfate and dodecylbenzene sulfonic acid.

The optimum concentration for the surfactant can be determined by routine experimentation. There is some indication that as concentration of DDBSA increases, activity of the surfactant increases until a maximum is reached, from there on activity diminishes with increased concentration. See Example 1 below. The degree of this effect at different conditions and whether it occurs at different conditions or with different surfactants can also be determined by routine experimentation.

The carcass is contacted with the aqueous solution for an amount of time effective to provide control of Salmonella. The current process not only provides for control of cross-contamination from one carcass to another, but also provides for control of Salmonella organisms on the carcass as well. The carcass is maintained in contact with the aqueous solution for a period of time sufficient to achieve the desired degree of control. This amount of time is dependent upon a number of factors which would be apparent to one skilled in the art, such as temperature of the solution and a number of other factors. Often it is not necessary to modify the processing procedure to allow sufficient contact time between the carcass and the aqueous solution. This is particularly true where the aqueous solution is used in the scald and/or chill tanks.

In addition to the acid and surfactant, the aqueous solution of this invention may also optionally contain additional additives, such as sorbic acid, salts of sorbic acid, or propylene glycol.

The current invention can be used along with techniques to enhance activity, such as aggitation, sonication either at sonic or ultrasonic frequencies, and other techniques.

The following examples further illustrate this invention, and are not intended to in any way limit its scope. Unless otherwise specified, throughout the specification and claims, all temperatures are centigrade and all concentrations and parts are by weight.

EXAMPLE 1

Commercially available chicken wings were used to study the effect of various treatments to control Salmonella. Some of the wings were used as obtained and some were innoculated with *Salmonella typhimurium* by dipping the wings in an aqueous suspension containing about $10^4$ organisms per ml and draining the wings for about 1 hour. For each experiment 8 test wings were immersed in test solutions containing indicated amounts of dodecylbenzene sulfonic acid (DDBSA) or sodium lauryl sulfate for 2½ minutes at about 52° C. The treated wings were tested for Salmonella by rinsing the wing in a lactose broth. The wing was removed from the broth and discarded. The broth was incubated at about 35° C. for about 24 hours. One ml aliquots of this broth were incubated for 24 hours in a selinite-crystine broth or a tetrathionate broth to selectively grow Salmonella and related organisms. This incubated broth was streaked onto plates containing either bismuth sulfite agar or Salmonella-Shigella agar, which are also selective for Salmonella. After incubation, the plates were examined for Salmonella colonies. Any existing colonies were tested to confirm they were Salmonella. The results are reported in Table I.

TABLE I

| Surfactant | Surf. Conc. | Acid/Base | Acid/Base Conc. | pH | Innoculated % Positive | Uninnoculated % Positive |
|---|---|---|---|---|---|---|
| none | — | none | — | 7 | 87% | 67% |
| DDBSA | 50 ppm | none | — | 7 | 75% | 50% |
| DDBSA | 100 ppm | none | — | 7 | 17% | 17% |
| DDBSA | 400 ppm | none | — | 7 | 92% | 50% |
| none | — | Acetic | 0.5% | 2.8 | 67% | 67% |
| none | — | NaOH | — | 9.0 | 58% | 25% |
| DDBSA | 50 ppm | H3PO4 | .05% | 2.5 | 42% | 67% |
| DDBSA | 100 ppm | H3PO4 | .05% | 2.5 | — | 33% |
| DDBSA | 50 ppm | Acetic | .05% | 3.3 | 70% | 50% |
| DDBSA | 100 ppm | Acetic | .05% | 3.3 | 50% | 33% |

EXAMPLE 2

A series of experiments was conducted in which commercial chicken wings were immersed in test solutions, some at 53° C. and some at 18° C. for varying amounts of time. Each experiment used 8 wings. Some experiments used wings that had been inoculated as described in Example 1. The wings were tested for Salmonella as described in Example 1. The percentage of the wings that tested positive is shown in Table II.

TABLE II

| Temperature | Time | Innoculated | Control | A | B | C | D |
|---|---|---|---|---|---|---|---|
| 53° C. | 2.5 min | yes | 62 | 25 | — | 37 | 25 |
| 53° C. | 2.5 min | no | 75 | 37 | — | 75 | 25 |
| 53° C. | 2.5 min | yes | 100 | 37 | — | — | — |
| 53° C. | 2.5 min | no | 100 | 62 | — | — | — |
| 18° C. | 120 min | no | 100 | 50 | — | 75 | — |
| 18° C. | 120 min | no | 87 | 50 | — | — | — |
| 18° C. | 120 min | no | 87 | — | 50 | — | — |
| 18° C. | 60 min | no | 87 | 12 | 12 | — | — |
| 18° C. | 15 min | no | 87 | 37 | 37 | — | — |
| 18° C. | 15 min | no | 87 | 62 | 87 | — | — |
| 18° C. | 5 min | no | 100 | 37 | 100 | — | — |
| 18° C. | 1 min | no | 100 | 100 | 50 | — | — |

TABLE II-continued

| Temperature | Time | Innoculated | Treatment Solution % Positive | | | | |
|---|---|---|---|---|---|---|---|
| | | | Control | A | B | C | D |
| 18° C. | 1 min | no | 87 | 100 | 100 | — | — |

Treatment A is 200 ppm DDBSA, 1200 ppm H$_3$PO$_4$, pH ~2
Treatment B is 200 ppm SLS, 1200 ppm H$_3$PO$_4$, pH ~2
Treatment C is 1% acetic acid, pH 2-2.5
Treatment D is NaOH, pH 10

EXAMPLE 3

Two series of experiments were conducted as in Example 1 at 18° C. for 1 hour, to determine the effect of pH. Eight uninnoculated wings were used in each run. Two hundred ppm of the indicated surfactant was used with sufficient phosphoric acid added to reach the indicated pH. The percentage of wings that tested positive is shown in Table III.

TABLE III

| Surfactant | pH | % Positive |
|---|---|---|
| none | neutral | 100% |
| DDBSA | 4.0 | 87% |
| DDBSA | 3.0 | 100% |
| DDBSA | 2.5 | 50% |
| DDBSA | 2.0 | 0% |
| SLS | 4.0 | 87% |
| SLS | 3.0 | 87% |
| SLS | 2.5 | 37% |
| SLS | 2.0 | 12% |
| none | 2.0 | 50% |

EXAMPLE 4

A series of experiments was conducted as in Example 1 at 18° C. for 1 hour to determine the effect of concentration of SLS at pH 2.3 in a phosphoric acid solution. Eight uninoculated wings were used for each experiment. The percentage of wings that tested positive is shown in Table IV.

TABLE IV

| SLS Conc. | % Positive |
|---|---|
| 0 (neutral pH) | 100% |
| 25 ppm | 87% |
| 50 ppm | 87% |
| 100 ppm | 62% |
| 200 ppm | 37% |
| 300 ppm | 37% |
| 400 ppm | 75% |
| 0 | 75% |

EXAMPLE 5

A series of experiments as described in Example 1 was done with other surfactants to determine their effectiveness. The surfactants were all used at 200 ppm with 1200 ppm phosphoric acid (pH 2.3). The results are shown in Table V.

TABLE V

| Surfactant | % Positive |
|---|---|
| Control (none) | 75% |
| Polyoxy Ethylene 23 Lauryl Ether[1] | 75% |
| Polyoxy Ethylene 20 Stearyl Ether[2] | 75% |
| Polyoxy Ethylene Sorbitan Monooleate[3] | 75% |
| Polyoxy Ethylene Sorbitan Monolaurate[4] | 75% |
| Polyoxy Ethylene Sorbitan Monostearate[5] | 75% |
| Dioctyl Sodium Sulfosuccinate[6] | 62% |
| Sodium Lauryl Sulfate | 37% |

[1] sold by ICI Americas, Inc. under the tradename Brij 35
[2] sold by ICI Americas, Inc. under the tradename Brij 78
[3] sold by ICI Americas, Inc. under the tradename Tween 80
[4] sold by ICI Americas, Inc. under the tradename Tween 20
[5] sold by ICI Americas, Inc. under the tradename Tween 60
[6] sold by American Cyanamide Co. under the tradename Aerosol OT (75% soln)

EXAMPLE 6

A series of experiments was conducted as in Example 5 to evaluate other surfactants. The Salmonella recovery procedure was as in Example 1. The results are in Table VI.

TABLE VI

| Surfactant | % Positive |
|---|---|
| Octylphenoxy Polyethoxy Ethanol[1] | 100% |
| Sorbitan Monostearate (400 ppm)[2] | 75% |
| Dodecylbenzene Sulfonic Acid | 37% |
| Oleic Acid | 100% |

[1] sold by Rohm and Haas Co. under the tradename Triton X-15
[2] sold by ICI Americas, Inc. under the tradename Span 60

EXAMPLE 7

A series of experiments was done to simulate commercial poultry processing. The birds were innoculated with *Salmonella cholerae-suis* by oral dosing in drinking water 4 days and 2 days prior to slaughter. This procedure produced very highly contaminated birds. The carcasses were processed in groups of 6, according to the following procedure. The birds were hung in shakles, stunned, bled, and immersed in a scald tank at about 52° C. for 2½ minutes. The carcasses were picked on a rotating picker, rehung and eviscerated. The eviscerated carcasses were placed in a 15 gallon (56.8 liters) iced chill tank at 0° C. for one hour. The scald tank and the chiller were modified by addition of the indicated additives. Some of the runs also used a potassium sorbate additive (KS). Twelve carcasses were processed under each of the indicated conditions. The carcasses were evaluated for Salmonella contamination by individually shaking each carcass in a bag with 100 ml of sterile water containing an aqueous solution of 0.6% sodium heptadecyl sulfate sold by Union Carbide Corporation under the tradename Tergitol Anionic 7. The carcass was discarded and the water solution was diluted with selinite-crysteine broth resulting in a normal concentration of broth. The broth was incubated for 24 hrs. at 35° C. and streaked onto three selective media, Bismuth Sulfite Agar, Hektoen Enteric Agar and *Salmonella Shigella* Agar. Any resulting colonies were transferred to beef heart infusion agar then to lysine iron agar and held for serotyping. The treatments and results are shown in Table VII.

TABLE VII

| Scald Tank Treatment | Chiller Treatment | % Positive |
|---|---|---|
| 1. No treatment | No treatment | 50% |
| 2. No treatment | 100 ppm Chlorine | 8% |
| 3. No treatment | 200 ppm DDBS 1200 ppm H$_3$PO$_4$, pH ~2.3 | 25% |

TABLE VII-continued

| Scald Tank Treatment | Chiller Treatment | % Positive |
|---|---|---|
| 4. No treatment | 1200 ppm KS*<br>200 ppm DDBS | 0% |
| 5. No treatment | 1200 ppm $H_3PO_4$, pH ~2.3<br>200 ppm SLS,<br>1200 ppm $H_3PO_4$, pH ~2.3 | 8% |
| 6. No treatment | 1200 ppm KS*<br>200 ppm SLS, | 33% |
| 7. 1% Lactic Acid, pH ~2.2 | 1% Lactic Acid, pH ~2.2 | 0% |
| 8. 200 ppm DDBSA | No treatment | 100% |
| 9. 200 ppm DDBSA, 1200 ppm $H_3PO_4$, pH ~2.3 | No treatment | 67% |
| 10. 200 ppm DDBSA, 1200 ppm $H_3PO_4$, pH ~2.3 | 200 ppm SLS | 58% |
| 11. NaOH, pH 10.5 | No treatment | 58% |
| 12. 1% Acetic Acid, pH ~3.0 | No treatment | 82% |
| 13. 200 ppm SLS | No treatment | 91% |
| 14. 200 ppm SLS, 1200 ppm $H_3PO_4$, pH ~2.3 | No treatment | 0% |
| 15. 200 ppm SLS, 1200 ppm $H_3PO_4$, pH ~2.3 | 200 ppm SLS | 0% |
| 16. 200 ppm, SLS, 1% Lactic Acid, pH ~2.2 | No treatment | 17% |

*KS treatment was done in additional 1 hour soak under chiller conditions.

The scald tank treatments with 1% lactic acid and 1% acetic acid were considered unsatisfactory because they resulted in a carcass with dry, fragile, easily split skin with a "bark-like" appearance.

EXAMPLE 8

A series of experiments were conducted on uninoculated commercially available chicken wings to simulate scald tank treatment and chiller treatment. The simulated scald tank was maintained at 52° C. and the wings were immersed for 2½ minutes and the chiller was at about 15° C. for 60 minutes. The wings were removed from the chiller and each wing was immediately shaken for 1 minute with 50 ml of water containing 0.6% Tergitol Anionic 7. The wing was discarded and 5 ml of selinite cystine broth was added resulting in a normal broth. After incubation at 35° C. for 24 hours, the broth was streaked on Salmonella and Shigella agar. Apparent positive colonies were biochemically confirmed as Salmonella. The results are shown in Table VIII.

TABLE VIII

| Scald Tank Treatment | Chiller Treatment | % Positive |
|---|---|---|
| 1. No treatment | No treatment | 87% |
| 2. No treatment | 1% Lactic Acid, pH ~2.3 | 0% |
| 3. No treatment | 0.5% Lactic Acid, pH ~2.5 | 37% |
| 4. No treatment | 0.1% Lactic Acid, pH ~3.0 | 75% |
| 5. No treatment | 200 ppm SLS, 0.5% Lactic Acid, pH ~2.5 | 25% |
| 6. No treatment | 200 ppm SLS, 0.1% Lactic Acid, pH ~2.9 | 100% |
| 7. No treatment | 1% Acetic Acid, pH ~2.8 | 0% |
| 8. No treatment | 0.5% Acetic Acid, pH ~3.0 | 37% |
| 9. No treatment | 200 ppm DDBSA, 1200 ppm $H_3PO_4$, pH ~2.3 | 75% |
| 10. No treatment | 200 ppm SLS, 0.1% Lactic Acid, adjusted to pH ~2.0 with $H_3PO_4$ | 12% |
| 11. No treatment | 200 ppm SLS, 1200 ppm $H_3PO_4$, pH ~2.3 | 50% |
| 12. 200 ppm SLS, 1200 ppm $H_3PO_4$, ~2.3 | 200 ppm SLS, 1200 ppm $H_3PO_4$, ~2.3 | 0% |

EXAMPLE 9

This Example illustrates the use of this invention along with sonication to enhance its activity. Uninnoculated, commercially available chicken wings were immersed in cold (18° C.) water for 3 minutes. Some wings were subjected to sonic treatment with a Branson Ultrasonic Cleaner (200 watts of power at 55 kHz) for the indicated time and the indicated amount of SLS was added to the water along with 1200 ppm of phosphoric acid resulting in a pH~2.3. The wings were removed and tested for Salmonella contamination as in Example 8.

The results of two sets of runs are summarized in Table IX.

TABLE IX

| Surfactant | Sonication Time (min.) | % Positive |
|---|---|---|
| Set A | | |
| 0 (no acid) | 0 | 57% |
| 0 (no acid) | 3 | 50% |
| 200 ppm SLS | 0 | 75% |
| 200 ppm SLS | 3 | 0 |
| Set B | | |
| 0 (no acid) | 0 | 87.5% |
| 0 (no acid) | 3 | 87.5% |
| 0 (with acid) | 0 | 87.5% |
| 0 (with acid) | 3 | 75% |
| 200 ppm SLS (no acid) | 0 | 75% |
| 200 ppm SLS (no acid) | 3 | 87.5% |
| 200 ppm SLS | 0 | 50% |
| 200 ppm SLS | 14 sec. | 12.5% |
| 200 ppm SLS | 1 | 12.5% |
| 200 ppm SLS | 2 | 12.5% |
| 200 ppm SLS | 3 | 50% |
| 200 ppm SLS | 3 | 37.5% |
| 50 ppm SLS | 3 | 50% |
| 100 ppm SLS | 3 | 37.5% |
| 400 ppm SLS | 3 | 37.5% |

EXAMPLE 10

A series of experiments was conducted on uninoculated chicken wings, simulating scald tank treatment. The simulated scald tank was maintained at 52° C. and the wings were immersed for 2½ minutes. The test solution contained 200 ppm of the indicated surfactant and 1200 ppm of phosphoric acid at a pH of about 2.3. Salmonella recovery was done as described in Example 7, with Shigella and Salmonella agar used for streaking the selinite cystine broth. The results are shown in Table X.

TABLE X

| Surfactant | % Positive |
|---|---|
| none | 87.5% |
| Methyl Naphthalene Sulfonic Acid[1] | 62.5% |
| Methyl Naphthalene Sulfonic Acid[2] | 75.0% |
| Sodium Lauryl Sulfate | 37.5% |

[1]Sold by Desoto, Inc. under the tradename Petro ULF (50% active).
[2]Sold by Henkel, Inc. under the tradename Sellogen NS 50 (50% active).

In addition to the Examples above illustrating the current invention, one skilled in the art will recognize a number of variations and alternatives within the scope of the current invention.

We claim:

1. A method for controlling Salmonella during processing of a meat-producing carcass comprising contacting the carcass for an effective amount of time with an aqueous solution, at an acid pH, comprising an effective amount of a surfactant selected from the group consisting of lauryl sulfate, dodecylbenzene sulfonic acid, a methyl naphthalene sulfonic acid and salts thereof.

2. The method of claim 1 wherein the surfactant is lauryl sulfate or salts thereof.

3. The method of claim 1 wherein the surfactant is dodecylbenzene sulfonic acid or salts thereof.

4. The method of claim 1 wherein the surfactant is a methyl naphthalene sulfonic acid or salts thereof.

5. The method of claim 1 wherein the aqueous solution contains phosphoric acid.

6. The method of claim 1 wherein the meat-producing carcass is a poultry carcass.

7. A method of controlling Salmonella during processing of a poultry carcass comprising contacting the carcass for an effective amount of time with an aqueous solution at a pH below about 4 and at a temperature from about 0° to about 60° C., said solution comprising phosphoric acid and from 50 to about 400 parts per million of a surfactant selected from the group consisting of lauryl sulfate, dodecylbenzene sulfonic acid, a methyl naphthalene sulfonic acid and salts thereof.

8. The method of claim 7 wherein the surfactant is lauryl sulfate or salts thereof.

9. The method of claim 7 wherein the surfactant is dodecylbenzene sulfonic acid or salts thereof.

10. The method of claim 7 wherein the surfactant is a methyl naphthalene sulfonic acid or salts thereof.

* * * * *